Patented Nov. 5, 1946

2,410,518

UNITED STATES PATENT OFFICE 2,410,518

PRODUCTION OF GLYCERIN FROM SUGAR BY YEAST FERMENTATION

Carl A. Neuberg, New York, and Irene S. Roberts, Fieldston, N. Y.

No Drawing. Application December 30, 1942, Serial No. 470,636

6 Claims. (Cl. 195—38)

This invention relates to improvements in the production of glycerin from sugar by yeast fermentation.

Two methods are generally known to convert the alcoholic fermentation into glycerin fermentation. Said methods have been outlined by one of the inventors, Carl Neuberg, together with E. Faerber, in 1916. (C. Neuberg and E. Faerber, Bioch. Z. 78,238, Dec. 1916).

According to both of the known methods a glycerin fermentation is obtained by preventing the normally occurring reduction of the acetaldehyde formed intermediary during the fermentation.

The first of said methods is the so-called method of fixation. It is characterized by the application of sulphites. Hereby the intermediarily formed acetic aldehyde is fixed. The reduction of acetaldehyde is prevented and glycerin is formed according to the following equations:

(No. 1) $C_6H_{12}O_6 = CH_3CHO + CO_2 + CH_2OH.CHOH.CH_2OH$ or, if the action of the sulphite is to be formulated:

(No. 2) $C_6H_{12}O_6 + Na_2SO_3 + H_2O = CH_3CHOH(SO_3Na) + NaHCO_3 + CH_2OH.CHOH.CH_2OH$

The second method, the method of dismutation, is based on the addition of any alkaline agents. In this case too, the sugar is decomposed according to Equation No. 1 mentioned above into acetaldehyde, carbon dioxide and glycerin. The mutase of the yeast, however, favored by the alkaline reaction, effects a dismutation of 2 mol. acetaldehyde into 1 mol. acetic acid, and 1 mol ethyl alcohol. The reaction proceeds according to the following equation:

(No. 3) $2C_6H_{12}O_6 + H_2O = CH_3COOH + C_2H_5OH + 2CO_2 + 2CH_2OH.CHOH.CH_2OH$

The mechanism of both these methods has been fully described by Neuberg and Reinfurth (Bio. Z. 89,365; 92,234, 1918. Neuberg and Hirsch, Bio. Z. 96,175; 98,141; 100,304, 1919; see also "Beilsteins Handbuch" Ergaenzungsband I, p. 266, 1928).

The following patents have been issued covering the sulphite method: Cocking and Lilly, U. S. P. 1,425,838, August 15, 1922; Connstein and Luedecke, U. S. P. 1,511,754, October 19, 1924. The bicarbonate method has been disclosed by: Eoff, U. S. P. 1,288,398, December 17, 1918.

Since the additions which are substantial for the formation of glycerin are poisonous for the yeast, selected varieties of yeast have to be applied according to the known processes, e. g.: certain kinds of baker's yeast and a special wine yeast. Most of the suggested special kinds of yeast are not produced commercially, but have to be grown in a sugar solution in order to adapt them to the milieu. It will be necessary to grow new amounts of yeast for every new application. Several days are required for the adaptation of the yeast, and organic as well as inorganic substances must be added to the grape juice suggested by one of the former inventors as "yeast food." This accounts for many of the impurities of the glycerin solution. According to general opinion brewer's yeast is unsuitable for glycerin fermentation. This certainly holds true for Central European brewer's yeast.

We have found that ordinary American brewer's yeasts which are mostly bottom yeasts, surprisingly, under special conditions, are perfectly suited for glycerin preparation by fermentation of sugar, when used together with agents adapted to prevent the reduction of acetaldehyde formed intermediary during the fermentation process.

No adaptation of yeast to the medium is necessary if the fermentation is performed under the special conditions which are subsequently described and which form a part of this invention.

(a) Instead of using brewer's yeast only, it is possible to add to the brewer's yeast a small percentage of baker's yeast. (Generally about 10 per cent. will be sufficient.)

(b) Another necessary condition is to carry out the fermentation under continuous mechanical stirring.

(c) Finally, it will be necessary to bubble continuously or intermittently added carbon dioxide through the reaction mass.

By this latter step a two-fold effect is reached, namely, a step, namely, a stirring action, and a decrease in pH of the alkaline $Na_2SO_3$ towards the neutral point, whereby any poisonous action of the additions on the yeast is reduced. The use of equal parts of $Na_2SO_3$ and $NaHSO_3$ as recommended in Patent No. 1,425,838 is unfavorable. The pH of this mixture is 6.2, which means that there is much free $H_2SO_3$ formed by dissociation. This acid is a very strong poison for the yeast. The poisonous action is so considerable that the sulphite mixture has to be added in 16 to 18 fractions within from 3 to 5 days. The fermentation time amounts to from 144 to 216 hours. The alkalinity of $Na_2SO_3$, however, can be decreased by addition of any acid or acid salts like $H_2SO_4$, HCl, acetic acid or $K_2S_2O_5$ or $SO_2$ in gas phase until a pH of 7.2–7.5 has been obtained. Addition of $CO_2$ brings the pH down to 7. The solution contains then $$NaHSO_3 + NaHCO_3 \rightleftharpoons Na_2SO_3 + H_2CO_3$$

During the fermentation process the pH will be practically constant. When the reaction product after the fermentation remains at temperatures of 30–35° C. a small rise of the pH will occur on account of a partial transformation of $NaHCO_3$ into $Na_2CO_3$.

The time required for the complete fermentation under our above named conditions is considerably shorter in comparison with the formerly applied baker's or wine yeast: 24 to 48 hours, as compared to from 144–216 hours.

The following examples are given:

Example 1

100 g. glucose in 500 cc. $H_2O$ are mixed with 90 g. brewer's yeast (containing 30% dry substance). When fermentation has started 65 g. of waterfree $Na_2SO_3$ in 450 cc. $H_2O$ are added in one operation under continuous stirring. Temperature: 32–35°. 10 minutes after addition of sulphite, pH is 7.2. At the end of the fermentation—after 24 hours—pH is 7.35. All of the sugar is fermented. Obtained: 13.2 g. acetaldehyde, 26.7 g. glycerin, 22.0 g. ethanol.

Example 2

As above, instead of the 90 g. brewer's yeast, however, 80 g. are applied, in mixture with 10 g. baker's yeast (dry substance 34%). Temperature 30–34°. Initial pH 7.1; final pH 7.3. Complete fermentation after 24 hours. Yields as in Example 1.

Example 3

100 g. glucose in 450 cc. $H_2O$. Start fermentation with 100 g. brewer's yeast (dry substance 30%). Add 100 g. $Na_2SO_3$ in 500 cc. $H_2O$. Add it in two fractions at 2½ hours interval. Temperature 33°. Continuous addition of $CO_2$, initially in quick stream, slowing down after 18 hours. Sugar completely fermented after 28 hours. pH prior to addition of $CO_2$ 7.75, after that 7.2, finally 7.4. Yield: 16.4 g. acetaldehyde, 33 g. glycerin.

Example 4

Same as No. 3, but 88 g. brewer's yeast plus 12 g. baker's yeast. Time of complete fermentation: 24 h.; yields practically as in No. 3.

Example 5

Start fermentation of 100 g. glucose in 500 cc. $H_2O$ with 90 g. brewer's yeast. Add mixture of 60 g. $Na_2SO_3$ plus 8.6 g. $NaHSO_3$ in 450 cc. $H_2O$. After 24 h. there is reducing sugar still present as proved with Ost's solution. Further addition of 30 g. fresh brewer's yeast, under continuous stirring. Temperature 33°. Fermentation completed after 46 hours. Initial pH: 7.05, final pH 7.7. Yields: 13.6 g. acetaldehyde, 27.2 g. glycerin.

Example 6

95 g. of saccharose (equivalent of 100 g. glucose) in 450 cc. $H_2O$. Start fermentation with 80 g. brewer's yeast plus 10 g. baker's yeast. Add mixture of 90 g. $Na_2SO_3$ plus 12.8 g. $NaHSO_3$ in 500 cc. $H_2O$ in two equal fractions, at an interval of 3 h. Add $CO_2$. After 24 h. still sugar present; therefore further addition of 25 g. brewer's yeast plus 5 g. baker's yeast. Fermentation completed after 49 h. Initial pH 7.0, final pH 7.4. Temperature 30–32°. Yields: 17.4 g. acetaldehyde, 35.2 g. glycerin, 14.6 g. ethanol.

When working on a larger scale, the quantity of yeast applied according to the above examples, can be reduced. If brewer's yeast of good resistance is applied, the quantities of yeast may be decreased up to ¼ of the quantities quoted heretofore. This holds true if sulphites are applied. In a purely alkaline solution, as obtained by alkali bicarbonates, the quantity of yeast to be used is to be determined by the resistance of the particular type of yeast.

Yields of glycerin and acetaldehyde are increased by higher concentration of the sulphites. However, a higher concentration of sulphite than mentioned in Examples 3, 4 and 6 is not rational, since the time required for the experiment increases because the addition of the agent of fixation can only be performed at considerable intervals. Time for complete fermentation increases also. The sugar not fermented according to Equation No. 1 undergoes in all cases ordinary alcoholic fermentation; accordingly ethanol is formed which is a valuable by-product like acetaldehyde.

The following products are usable as sources of sugar in this process: glucose, saccharose, maltose, invert sugar, molasses, and all such materials or liquids containing the above named sugars. Due to the short time (4.5–6 times shorter than in known processes) required for the complete fermentation according to this process only few impurities from dead and autolyzed yeast cells will enter the solution. The isolation of glycerin can therefore be performed in a simple way.

If brewer's yeast has been applied, the fermentation mixture is clear to a substantial degree by spontaneous sedimentation of the yeast. The liquid on top can easily be clarified by filtration or centrifugation. (If yeast sediments poorly, quick results can be obtained by adding approximately 5% of the weight of the originally applied sulphite of $CaCl_2$ or $BaCl_2$, or $FeSO_4$, $Fe_2(SO_4)_3$, $Al_2(SO_4)_3$ or fuller's earth, etc., to the glycerin beer.) The rest of the solution containing glycerin is treated in the same way, i. e.: centrifugation or filtration from the yeast mash. The acetalydehyde and ethyl alcohol formed simultaneously with the glycerin are isolated by distillation according to the known processes. The glycerin solution is further concentrated and either treated in an "atomizer" until a thick product is obtained which is interspersed with the various salts previously added or formed during the process respectively ($NaHCO_3$ from $Na_2SO_3$), or concentrated further, preferably in vacuo. From said residues a rather pure glycerin can be obtained by extraction. Suitable solvents for extractions are for instance: ethyl alcohol (for example the ethanol containing acetaldehyde, as obtained simultaneously in the process of fermentation itself), or butanol, isopropyl alcohol, isobutyl alcohol, benzyl alcohol, cyclohexanol, its homologues, furfuryl alcohol, terahydrofurfuryl alcohol.

In presence of small quantities of ethanol the following solvents are suitable: dioxane, methylpropylketone, methyl-isopropyl-ketone, methyl-hexyl-ketone, ethyl acetate, amyl acetate. Hot or cold extraction may be performed, preferably under mechanical stirring. The solvents are recovered by simple fractionation, in vacuo if necessary. The glycerin which has been freed of the salts by the above mentioned solvents is then refined. If working with solvents which will not mix readily with water, the glycerin, by shaking with water, can be transferred into the water fraction. Impurities will stay in the solvent. In either case, a difficult purification of the mash by means of acids, alkalies, earth alkalies, metal salts, as previously used, is unnecessary. This process avoids heating to high temperatures with superheated water vapor, and decomposition of glycerin and formation of bad smelling products formed by the decomposition of glycerin and its accompanying impurities.

We have described preferred embodiments of this invention, but it will be understood that various changes will be made without departing from the scope of this invention.

What we claim is:

1. In the process of producing glycerine by fermentation of sugar with yeast, in which the reduction of acetaldehyde formed intermediary during the fermentation process is prevented by known means, the combination of the steps comprising generally the use of commercial brewers' yeast in an amount exceeding the amount of yeast merely sufficient for the fermentation of the given amount of sugar; continuously stirring the reaction mass; bubbling added carbon dioxide therein; and maintaining a pH of 7.2–7.5 during the reaction.

2. In the process of producing glycerine according to claim 1, the use of a mixture of about 90 per cent. of commercial brewers' yeast and about 10 per cent. of bakers' yeast.

3. A method of producing glycerine by yeast fermentation according to claim 1, comprising the use of sulphite in the fermentation process to which acid salts are added until a pH of 7.2–7.5 has been obtained.

4. In the process of producing glycerine by yeast fermentation of sugar which comprises continuously stirring the reaction mass and bubbling carbon dioxide through the reaction mass, which contains commercial brewers' yeast and sulphites, the concentration of the glycerine formed by evaporation and the extraction of the same with solvents of the class consisting of aliphatic-mono-alcohols, aromatic-mono-alcohols, and hydro-aromatic-monoalcohols which are insoluble, or barely soluble, in water.

5. A process according to claim 4 comprising the extraction of the concentrated glycerine with cyclohexanol.

6. A process according to claim 4 which comprises extraction of the concentrated glycerine with benzyl-alcohol.

CARL A. NEUBERG.
IRENE S. ROBERTS.